United States Patent
Morys

(10) Patent No.: US 10,914,856 B2
(45) Date of Patent: *Feb. 9, 2021

(54) HIGH RESOLUTION DOWNHOLE IMAGING

(71) Applicant: HALLIBURTON ENERGY SERVICES, INC., Houston, TX (US)

(72) Inventor: Marian Morys, Downingtown, PA (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 323 days.

This patent is subject to a terminal disclaimer.

(21) Appl. No.: 15/692,478

(22) Filed: Aug. 31, 2017

(65) Prior Publication Data
US 2017/0363766 A1    Dec. 21, 2017

Related U.S. Application Data

(63) Continuation of application No. 13/811,519, filed as application No. PCT/US2010/043853 on Jul. 30, 2010, now Pat. No. 9,766,363.

(51) Int. Cl.
*G01V 3/30* (2006.01)
*G01V 11/00* (2006.01)

(52) U.S. Cl.
CPC .............. *G01V 3/30* (2013.01); *G01V 11/007* (2013.01); *G01V 2210/6163* (2013.01)

(58) Field of Classification Search
CPC . G01V 11/007; G01V 3/30; G01V 2210/6163
USPC ......................................................... 367/35
See application file for complete search history.

(56) References Cited

U.S. PATENT DOCUMENTS

| | | |
|---|---|---|
| 4,319,345 A | 3/1982 | Dennis |
| 4,665,511 A | 5/1987 | Rodney et al. |
| 4,733,380 A | 3/1988 | Havira |
| 4,843,597 A | 6/1989 | Gjessing et al. |
| 4,904,942 A | 2/1990 | Thompson |
| 5,001,676 A | 3/1991 | Broding |
| 5,044,462 A | 9/1991 | Maki |
| 5,159,578 A | 10/1992 | Lenhardt et al. |
| 5,179,541 A | 1/1993 | Weido |

(Continued)

FOREIGN PATENT DOCUMENTS

| | | |
|---|---|---|
| GB | 2326717 | 12/1998 |
| GB | 2422433 | 3/2008 |

(Continued)

OTHER PUBLICATIONS

Australian Application Serial No. 2010358076, First Examination Report dated Feb. 12, 2013, 3 pgs.

(Continued)

*Primary Examiner* — Daniel L Murphy

(57) ABSTRACT

Apparatus having a focused transducer and methods of operating a focused transducer downhole in a well can provide high resolution downhole imaging. In various embodiments, a focused transducer is used for imaging downhole in a well in which the imaging is based on a seismoelectric effect. In various embodiments, a focused transducer is used for imaging downhole in a well in which the imaging is based on an electroacoustic effect. Additional apparatus, systems, and methods are disclosed.

20 Claims, 6 Drawing Sheets

(56) References Cited

U.S. PATENT DOCUMENTS

| | | |
|---|---|---|
| 5,212,353 A | 5/1993 | Rambow et al. |
| 5,274,604 A | 12/1993 | D'Angelo et al. |
| 5,491,668 A | 2/1996 | Priest |
| 5,563,846 A | 10/1996 | Fillon |
| 5,597,042 A | 1/1997 | Tubel et al. |
| 5,644,550 A | 7/1997 | Priest |
| 5,662,165 A | 9/1997 | Tubel et al. |
| 5,676,213 A | 10/1997 | Auzerais et al. |
| 5,717,169 A | 2/1998 | Liang et al. |
| 5,730,219 A | 3/1998 | Tubel et al. |
| 5,841,280 A | 11/1998 | Yu et al. |
| 6,006,832 A | 12/1999 | Tubel et al. |
| 6,018,496 A | 1/2000 | Stanke et al. |
| 6,065,538 A | 5/2000 | Reimers et al. |
| 6,147,497 A | 11/2000 | Berryman et al. |
| 6,188,643 B1 | 2/2001 | Liang et al. |
| 6,209,640 B1 | 4/2001 | Reimers et al. |
| 6,476,608 B1 | 11/2002 | Dong |
| 6,597,633 B1 | 7/2003 | Millar et al. |
| 6,664,788 B2 | 12/2003 | Hornbostel et al. |
| 6,842,697 B1 | 1/2005 | Millar et al. |
| 6,918,293 B2 | 7/2005 | Moake et al. |
| 7,042,801 B1 | 5/2006 | Berg |
| 8,682,587 B2 | 3/2014 | Singer et al. |
| 8,749,241 B2 | 6/2014 | Edwards et al. |
| 9,766,363 B2 * | 9/2017 | Morys .................. G01V 11/007 |
| 2002/0153897 A1 | 10/2002 | Evans et al. |
| 2003/0048695 A1 | 3/2003 | Calvert |
| 2007/0035306 A1 | 2/2007 | Forgang et al. |
| 2008/0066920 A1 | 3/2008 | Allcorn et al. |
| 2008/0128166 A1 | 6/2008 | Forgang et al. |
| 2008/0306692 A1 | 12/2008 | Singer et al. |
| 2009/0108845 A1 | 4/2009 | Kaminski |
| 2009/0173500 A1* | 7/2009 | Orban .................. E21B 33/138 166/298 |
| 2009/0179649 A1 | 7/2009 | Schmidt et al. |
| 2009/0222209 A1 | 9/2009 | Morys |
| 2011/0019500 A1 | 1/2011 | Plyuschenkov et al. |
| 2011/0080806 A1* | 4/2011 | Normann .................. G01V 1/46 367/35 |
| 2011/0141847 A1 | 6/2011 | Frumin et al. |
| 2013/0091941 A1 | 4/2013 | Huh et al. |

FOREIGN PATENT DOCUMENTS

| | | |
|---|---|---|
| WO | WO 2001/051880 A2 | 7/2001 |
| WO | WO 22008/097121 A1 | 8/2008 |
| WO | WO 2012/015421 A1 | 2/2012 |

OTHER PUBLICATIONS

Australian Application Serial No. 2010358076, Response filed Sep. 16, 2013 to First Examination Report dated Feb. 12, 2013, 2 pgs.

Canadian Application Serial No. 2,806,145, Amendment filed Jan. 16, 2015 to Office Action dated Jul. 25, 2014, 13 pgs.

Canadian Application Serial No. 2,806,145, Office Action dated Jul. 25, 2014, 2 pgs.

European Application Serial No. 10739452.0, Office Action dated Feb. 15, 2013, 2 pgs.

European Application Serial No. 10739452.0, Response filed Aug. 15, 2013 to Office Action dated Feb. 15, 2013, 14 pgs.

International Application Serial No. PCT/US10/43853, Response filed May 30, 2012 to Written Opinion dated Apr. 12, 2011, 3 pgs.

International Application Serial No. PCT/US10/43853, Search Report dated Apr. 12, 2011, 5 pgs.

International Application Serial No. PCT/US10/43853, Written Opinion dated Apr. 12, 2011, 6 pgs.

International Application Serial No. PCT/US2010/043853, International Preliminary Report on Patentability dated Jul. 25, 2012, 5 pgs.

Mexican Application Serial No. MX/a/2013/001121, Office Action dated Jul. 2, 2013, (w/English Summary), 4 pgs.

Neishtadt, Nahum M., et al., "Application of piezoelectric and seismoelectrokinetic phenomena in exploration geophysics: Review of Russian and Israeli experiences", Geophysics, 71, (2006), B41-B53.

Zhan, Xin, "A Study of Seismoelectric Signals in Measurement While Drilling", Thesis, Massachusetts Institute of Technology, (Sep. 2005), 98 pgs.

Zhu, Zhenya, et al., "Theoretical and Experimental Studies of Seismoelectric Conversions in Boreholes", Communications in Computational Physics, 3(1), (2008), 109-120.

* cited by examiner

HIGH RESOLUTION DOWNHOLE IMAGING

CROSS-REFERENCE TO RELATED APPLICATIONS

The present application is a continuation of U.S. application Ser. No. 13/811,519 filed on 19 Mar. 2013, which is a U.S. National Stage Filing under 35 U.S.C. 371 from International Application No. PCT/US2010/043853, filed on 30 Jul. 2010, and published as WO 2012/015421 A1 on 2 Feb. 2012. The entire disclosures of these prior applications are incorporated herein by this reference in their entirety.

TECHNICAL FIELD

The invention relates generally to systems for conducting well operations.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment are made at these locations. Further, the usefulness of such measurements may be related to the precision or quality of the information derived from such measurements.

DETAILED DESCRIPTION

The following detailed description refers to the accompanying drawings that show, by way of illustration and example only, various embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description and accompanying drawings are, therefore, not to be taken in a limiting sense.

Figure 1:
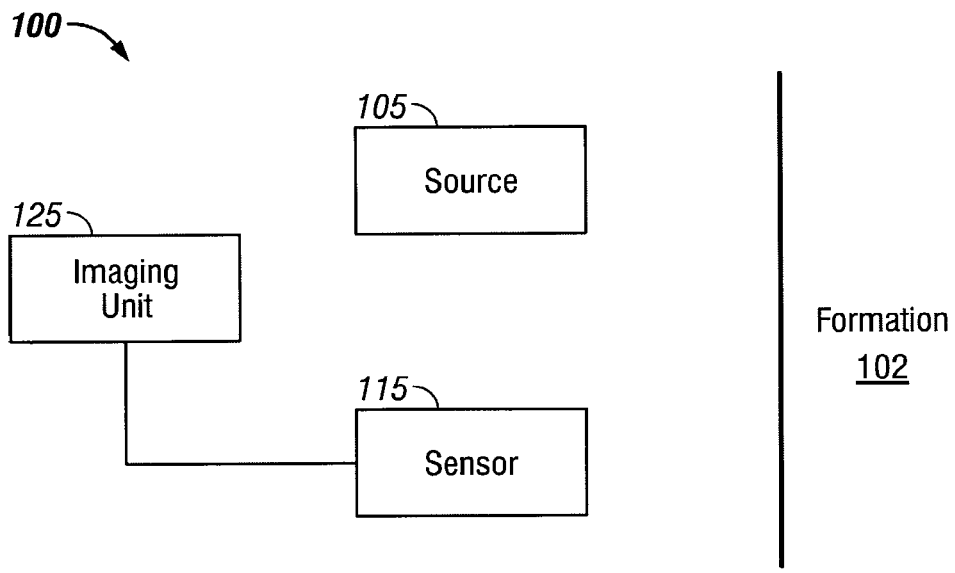
FIG. 1 shows a block diagram of an example apparatus having a source to expose a formation to a probe signal to image the formation, according to various embodiments.

FIG. 1 shows a block diagram of an embodiment of an apparatus 100 having a source 105 to expose a formation 102 to a probe signal to image formation 102. Apparatus 100 includes a sensor 115 to sense a converted signal, where the converted signal is based on conversion of the probe signal between acoustic energy and electromagnetic energy. Source 105 or sensor 115 can include a focused transducer. The focused transducer can be realized as a focused acoustic transducer. The converted signal received by apparatus 100 can be used in an imaging unit 125 to image the formation using the converted signal.

Source 105 can include a focused acoustic transducer with sensor 115 including a magnetic field sensing sensor. Source 105 can include a focused acoustic transducer with sensor 115 including electrical electrodes. Source 105 can include a magnetic field source with sensor 115 including a focused acoustic transducer. Source 105 can include electrical electrodes with sensor 115 including a focused acoustic transducer. Such arrangements using a focused transducer can provide very high resolution with sufficient contrast to detect lamination in a formation downhole in a borehole. Thin formation laminations with resolution of 0.25" may be detected.

Apparatus 100 can include electronics to excite source 105. The electronics may be located downhole in close proximity to source 105, at the surface of the well, or at locations between the earth surface and proximity to the measurement in the borehole. Appropriate communications can be used to control activation of source 105. A communications unit operable to transmit information to earth surface from downhole in a well can be used, where the information is correlated to the converted signal. In addition, apparatus 100 can include a signal processing unit coupled to sensor 115. Such a signal processing unit can include imaging unit 125. The signal processing unit may be used to process the received converted signal at sensor 115 before processed into an image by imaging unit 125. Imaging unit 125 and such a processing unit can be located at the surface of the well, downhole in the well, or distributed among units at the drilling site, where some of which may be downhole and others at the surface. Apparatus 100 can be structured for an implementation in the borehole of a well as a measurements-while-drilling (MWD) system, such as a logging-while-drilling (LWD) system, or as a wireline system.

To enhance the imaging capabilities of apparatus 100, apparatus 100 may include a source of magnetic particles, where the source is operable to inject the magnetic particles in fluid in pores of formation 102. The source of magnetic particles may include a source of magnetic nanoparticles. Doping the fluid, filling the pores of a formation with magnetic particles, may enhance conversion of the probe signal between acoustic energy and electromagnetic energy in generating the converted signal received at sensor 115. For example, when excited by an electromagnetic field, doping nanoparticles suspended in the fluid in pores of the formation can produce acoustic echo at double the excitation frequency due to domain rotation. This can serve as a mechanism to discriminate the signal from injected nanoparticles from that induced by the formation fluids. Doping of the fluid can be done on the surface, for example, by adding magnetic particles to the drilling mud or displacing existing borehole fluid with one containing magnetic particles.

Further, such an effect can be used to study invasion profiles and invasion progression in LWD applications, where drilling fluid is doped with magnetic nanoparticles. Drilling fluid is referred to as mud. Drilling fluids can contain significant amounts of suspended solids, emulsified water, or oil. Mud includes all types of water-base, oil-base, and synthetic-base drilling fluids. Invasion is a process in which filtered mud or whole mud enters a porous or permeable formation. The entering mud displaces some or all of the moveable fluids in the formation, leaving an invaded zone. Such invasion depends on formation permeability, among other factors.

Figure 2:
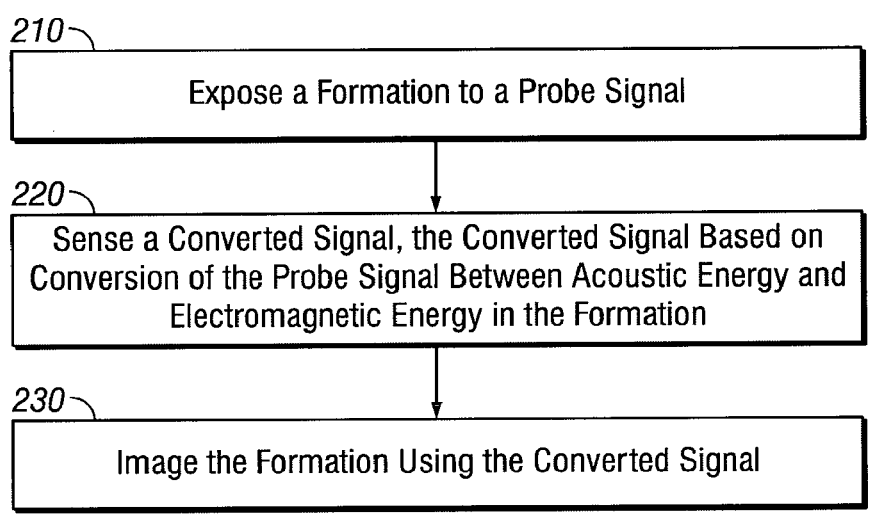
FIG. 2 shows features of an example method for imaging formations downhole in a well, according to various embodiments.

FIG. 2 shows features of an embodiment of a method for imaging formations downhole in a well. Apparatus 100 of FIG. 1, or similar or identical apparatus to those discussed herein, may be used in such a method. At 210, a formation downhole in a well is exposed to a probe signal. At 220, a converted signal is sensed in response to exposing the formation to the probe signal. The converted signal is based on conversion of the probe signal between acoustic energy and electromagnetic energy in the formation. A focused transducer is used in generating the probe signal or in sensing the probe signal. The probe signal can be an acoustic signal with the converted signal being an electromagnetic signal. An acoustic probe signal can be realized as a focused acoustic pressure pulse or a focused acoustic continuous wave. The probe signal can be an electromagnetic signal and with the converted signal being an acoustic signal. The electromagnetic probe signal can be realized as an electromagnetic pulse or an electromagnetic continuous wave, where the converted signal is sensed using a focused acoustic transducer.

At 230, the formation is imaged using the converted signal. The converted signal can be gated to select a signal generated at the apex of a pressure wave. The converted signal can be filtered with a narrow band matched filter to discriminate the selected signal from noise. Resolution and/or contrast may be enhanced by doping fluid in pores of the formation with magnetic particles. Doping fluid in pores of the formation may include doping the fluid in pores of the formation with magnetic nanoparticles. Such magnetic nanoparticles can include, but are not limited to, nanoparticles of iron-containing compositions and/or vanadium-containing compositions.

Acoustic impedance and resistivity imaging have been used for imaging in the past. While imaging with focused ultrasonic sensors in an acoustic imaging process can achieve high resolution, the acoustic impedance contrast may not be sufficient to detect lamination. Also, echo in such acoustic imaging processes is very sensitive to borehole geometry, for example, fractures and surface structure. The resistivity measurement in such acoustic imaging may detect laminations, but it is very hard in these processes to achieve high resolution, especially in non-conductive muds.

In various embodiments, methods and apparatus include a source and/or a sensor sensitive to seismoelectric or magneto-acoustic properties of the formation rock and fluid that includes the high resolution associated with using a focused ultrasonic sensor. In addition, a focused acoustic transducer can be used in an apparatus implementing an electroacoustic effect. The seismoelectric effect is the phenomenon of generating an electric response from propagating acoustic waves. Propagation of sound waves through a porous body filled with liquid can generate the electric response. In the electroacoustic effect, sound waves are generated in response to an electromagnetic field propagating in a material. Magneto-acoustic properties of material provide for conversion of energy between magnetic energy and acoustic energy. Such properties can be correlated with the mineral composition of the rock, its porosity and permeability. When used with doped mud, the development of invasion can also be studied.

In various embodiments, methods and apparatus are implemented for formation imaging downhole in a well that can provide high resolution imaging. An example imaging method is based on the seismoelectric effect, where the borehole wall and formation behind it are exposed to a focused acoustic signal. The focused signal can be a focused acoustic pressure pulse or continuous wave and the resulting electromagnetic field resulting from seismoelectric conversion can be sensed by either magnetic field sensing coils or sensing electrodes disposed on the tool. Another example imaging method is based on the electroacoustic effect, where the formation is exposed to electromagnetic radiation, either a pulse or a continuous wave, and the resulting acoustic wave is sensed by one or more focused acoustic transducers. Such imaging based on the seismoelectric or the electroacoustic effect can detect thinly laminated formations. These methods and apparatus can be configured in both wireline and LWD applications. In addition, all mud types may be compatible with these embodiments.

Previous use of seismoelectric and electroacoustic effect for borehole logging has been based on excitation of a large area of the formation with an acoustic pressure wave. As a consequence in these previous procedures, the spatial resolution of these methods is poor and additional computational steps are taken to improve the spatial resolution of the seismoelectric image. In various embodiments, as discussed herein, tools are configured to utilize the high resolution capabilities of a focused acoustic transducer to enhance the resolution of seismoelectric or electroacoustic signal generated in borehole wall.

In various embodiments, a focused acoustic transducer can be used in a seismoelectric tool or an electroacoustic tool. The focused acoustic transducer can be implemented either with fixed focus or by implementing active and dynamic focusing. A fixed focus can be realized, for example, by shaping the face of the transducer in a concave manner. Active and dynamic focusing can be realized by implementing active and dynamic focusing capable of adapting the focus point to varying distance to the borehole.

An acoustic transducer can be realized as an array of N transducers in which each transmitter of each transducer of the array is controlled with digital logic such that each one produces a pulse at the appropriate time to cause the acoustic energy to be focused at the desired distance from the transducer. In a receive mode of the acoustic transducer, the signal from each elemental transducer can be directed to a preamplifier and then to a multi-tap delay line. With N elemental transducers, N−1 delay lines can be used that are selectively tapped such that the outputs of a number of these delay lines are summed at a summing amplifier to provide an output. The summed output can provide the received signal focused at the same range as would a transmitted signal be focused. Alternatively, the transducer may also be dynamically focused by selecting appropriate taps of the delay lines as a function of time. Selecting appropriate taps of the delay lines as a function of time can cause the focus for the received signal to be correct for any received signal. By choosing fewer than all of the transducer elements as the receiver, the apparent aperture and therefore the degree of focusing may be changed. Many degrees of focusing are available simultaneously during a measurement cycle. To implement phase contrast, the phase difference between a highly focused signal and a less focused signal can be compared. The phase difference provides an indication of the difference in distance between the highly focused signal image and the less focused image. Other types of focused transducers may be used. A selected focused acoustic transducer can be implemented as a single transducer or an array thereof that can be deployed on a tool collar.

In various embodiments, a focused acoustic transducer can be used to operate both in an acoustic mode and in a seismoelectric mode or an electroacoustic mode. In an acoustic mode, the focused acoustic transducer transmits an acoustic signal and receives an acoustic signal in response to the transmitted acoustic signal, where the received acoustic signal can be processed to provide parameters associated with imaging the formation into which the focused acoustic signal was directed. The acoustic mode can be used with the seismoelectric mode, in which the same acoustic transducer is used to simultaneously image the acoustic impedance contrast of the borehole to formation interface, the borehole geometry (including fractures), the texture of the borehole wall, and the sensor distance to borehole wall. This can be accomplished by sensing and processing the return echo on the acoustic transducer. The distance to the borehole wall can further be used to correct for standoff effects on the seismoelectric or electroacoustic image of the formation. Standoff effects are effects due to the distance (standoff) between the external surface of a tool, such as a logging tool, and the borehole wall. This distance may have an important effect on the response of a measurement.

Both a seismoelectric and an electroacoustic tool can operate in, but are not limited to, the frequency range of 50 KHz to 2 MHz, depending on the desired depth of investigation, resolution, and the borehole mud attenuation of the pressure wave. For heavy muds, lower frequencies, in the order of 200-400 kHz, can be used. Frequencies other than in the range 50 KHz to 2 MHz can also be used.

In addition, image quality can be enhanced by implementation of motion correction. Correcting a motion related distortion in a distance measurement may include establishing a reference position in a borehole, measuring a plurality of substantially radial distances from the tool to a wall in a borehole as the tool makes a revolution in the borehole, sensing the motion of the tool in the borehole between each measurement, calculating the tool position and the toolface angle corresponding to each of the plurality of distance measurements based on the sensed motion of the tool, and calculating a corrected distance and corrected toolface angle referenced to the reference position for each of the plurality of radial distance measurements. The sensed motion of the tool can be tool acceleration. The radial distances can be obtained by transmitting an acoustic signal from the tool to the wall of the borehole and detecting a reflected acoustic signal from the wall of the borehole. Based at least in part on the amplitude and phase of the reflected acoustic signal referenced to the transmitted acoustic signal, the sound speed and attenuation coefficient of the drilling fluid in the borehole can be calculated. The measurements can be made with various devices disposed in the tool or disposed in another tool disposed in a position related to the seismoelectric tool or electroacoustic tool. Such devices may include, but are not limited to, one or more of an acoustic imaging transducer, a magnetic resonance imaging sensor, an electromagnetic wave resistivity sensor, an acoustic transducer, a mechanical caliper transducer, accelerometer, a magnetometer, or a gyroscope.

Figure 3:
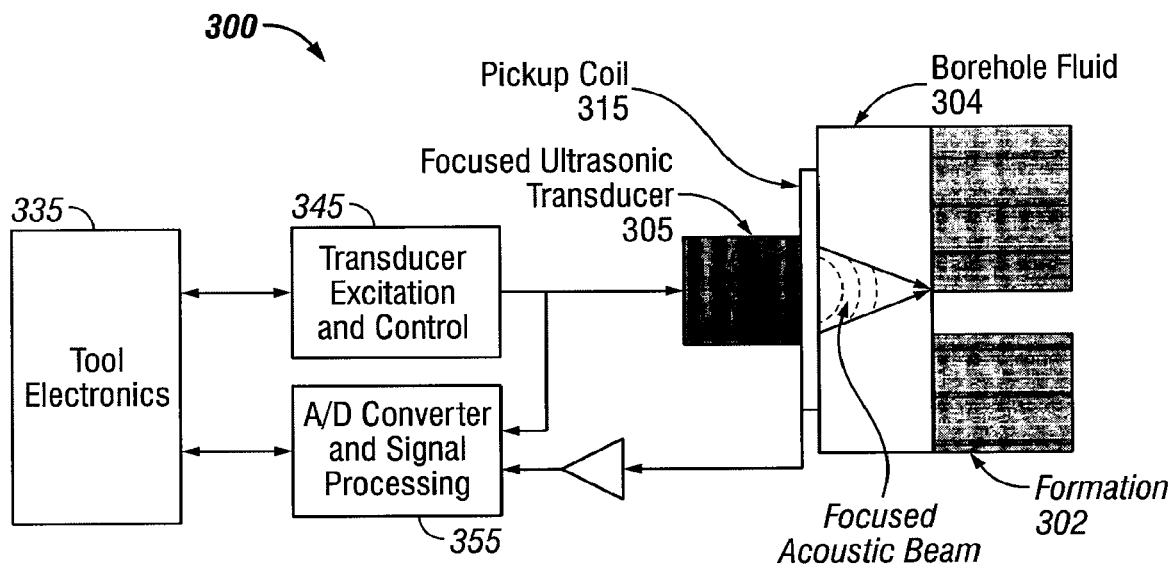
FIG. 3 shows a block diagram of an example implementation of a seismoelectric tool having a magnetic field sensor arranged to receive an electromagnetic signal from a formation in response to an acoustic signal from the source directed to the formation, according to various embodiments.

FIG. 3 shows a block diagram of an embodiment of an example implementation of a seismoelectric tool 300 having a magnetic field sensor 315 arranged to receive an electromagnetic signal from formation 302 in response to an acoustic signal from a source 305. Source 305 can be realized as a focused ultrasonic transducer 305. Magnetic field sensor 315 can be realized as one or more magnetic field sensing coils. Magnetic field sensor 315 can involve a single coil disposed near transducer 305 or plurality of coils in various arrangements sensitive to particular orientations of the magnetic field vector in the received electromagnetic signal from the acoustic signal directed through borehole fluid 304 to formation 302. The coils can be potted in an acoustically lossy medium to reduce unwanted signals related to direct acoustic coupling between acoustic transducer 305 and the coils 315. Magnetically permeable backing or cores can be used to enhance the sensitivity of magnetic coils 315 to an electromagnetic field. Signal from one coil or a combination (sum or difference with different weights) of signals from multiple coils can be used to increase the sensitivity of the tool to the seismoelectric effect, while reducing the sensitivity to direct coupling between acoustic transducer 305 and the coils 315. Seismoelectric tool 300 may operate with one or more features discussed with respect to FIGS. 1 and 2.

Seismoelectric tool 300 includes tool electronics 335, transducer excitation and control 345, and A/D converter and signal processing 355. Tool electronics 335 can include electronics to control the tool, data storage, and surface communications. Transducer excitation and control 345 provides control signals to excite focused transducer 305 and to control focused transducer 305 to effectively limit the region of formation 302 excited to a focused region. A/D converter and signal processing 355 processes the received electromagnetic signal from pickup coil 315. The processed signal can be submitted to tool electronics 335 for data storage and/or real time surface communication. Tool electronics 335 and/or A/D converter and signal processing 355 may include an imaging unit or a portion of the imaging unit, such as imagining unit 125 of FIG. 1. Processing by A/D converter and signal processing 355 and tool electronics 335 can include processing the received signal from the seismoelectric effect to image the formation with the final processing for displaying the image conducted at the surface. Tool electronics 335, transducer excitation and control 345, and A/D converter and signal processing 355 may be integrated with various components distributed in a wireline tool or in a LWD tool.

Figure 4:
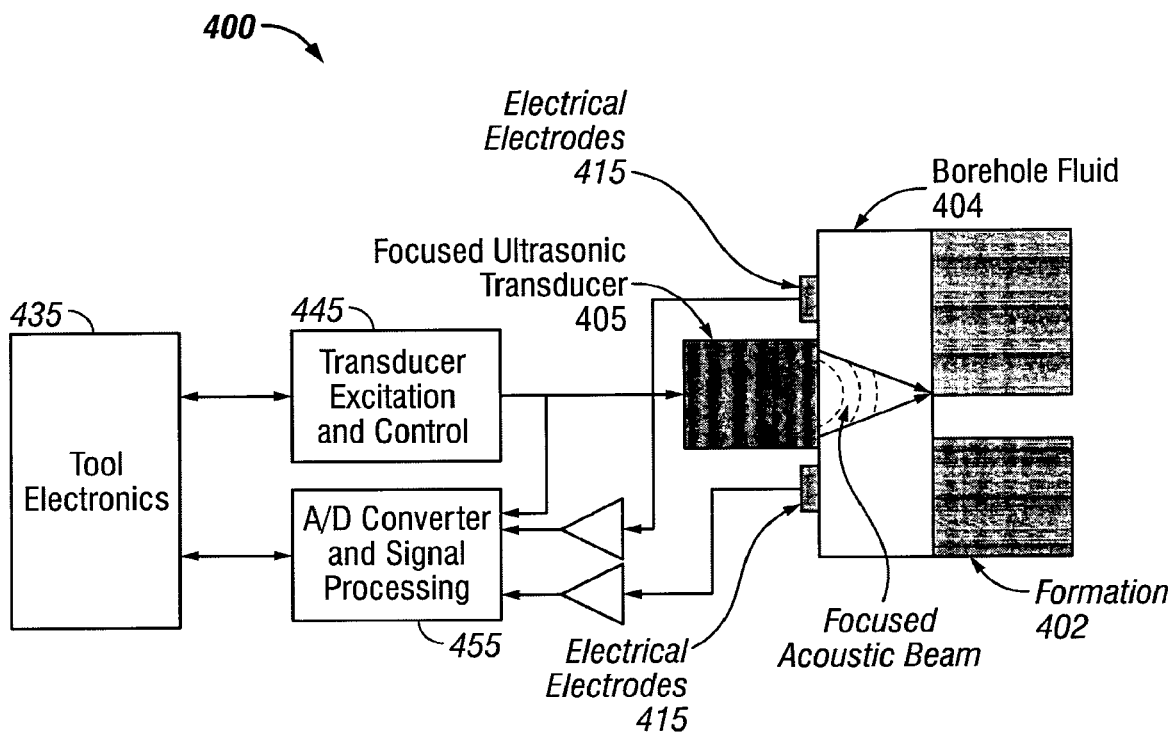
FIG. 4 shows a block diagram of an example implementation of a seismoelectric tool having electrical electrodes arranged to receive an electromagnetic signal from a formation in response to an acoustic signal from the source directed to the formation, according to various embodiments.

FIG. 4 shows a block diagram of an embodiment of an example implementation of a seismoelectric tool 400 having electrical electrodes 415 arranged to receive an electromagnetic signal from formation 402 in response to an acoustic signal from a source 405. Source 405 can be realized as a focused ultrasonic transducer 405. Electrical electrodes 415 can be realized as two or more electric electrodes to receive an electromagnetic signal from the acoustic signal directed through borehole fluid 404 to formation 402. Seismoelectric tool 400 may operate with one or more features discussed with respect to FIGS. 1 and 2.

Seismoelectric tool 400 includes tool electronics 435, transducer excitation and control 445, and A/D converter and signal processing 455. Tool electronics 435 can include electronics to control the tool, data storage, and surface communications. Transducer excitation and control 445 provides control signals to excite focused transducer 405 and to control focused transducer 405 to effectively limit the region of formation 402 excited to a focused region. A/D converter and signal processing 455 processes the received electromagnetic signal from electrical electrodes 415. The processed signal can be submitted to tool electronics 435 for data storage and/or real time surface communication. Tool electronics 435 and/or A/D converter and signal processing 455 may include an imaging unit or a portion of the imaging unit, such as imagining unit 125 of FIG. 1. Processing by A/D converter and signal processing 455 and tool electronics 435 can include processing the received signal from the seismoelectric effect to image the formation with the final processing for displaying the image conducted at the surface. Tool electronics 435, transducer excitation and control 445, and A/D converter and signal processing 455 may be integrated with various components distributed in a wireline tool or in a LWD tool.

A seismoelectric sensor can use either magnetic field sensing, as shown in FIG. 3, or electrical sensing, as shown in FIG. 4, of the acoustically induced electromagnetic field or both magnetic sensing and electrical sensing simultaneously. The choice of the sensing method may be influenced by the conductivity of the borehole fluid.

Figure 5:
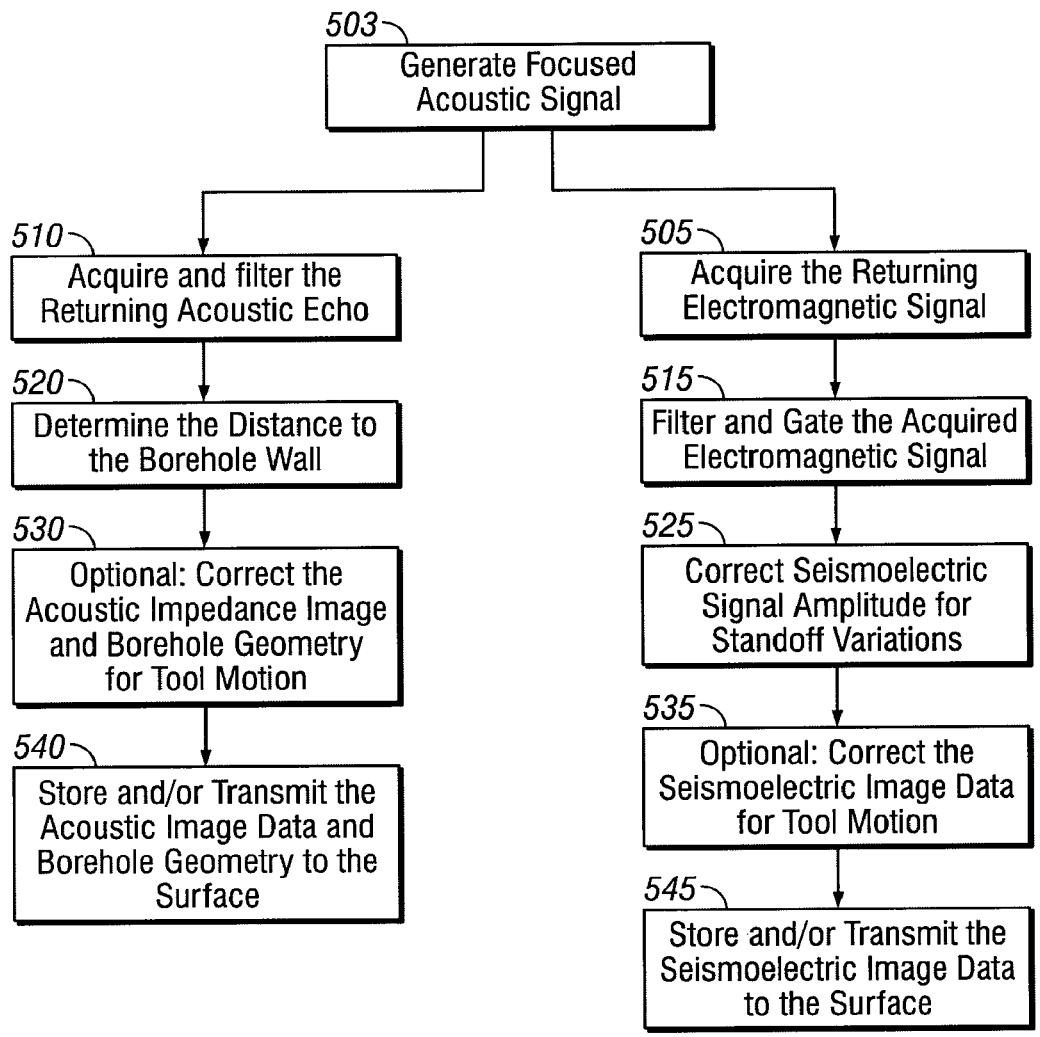
FIG. 5 shows an example signal processing chain for a seismoelectric tool, according to various embodiments.

FIG. 5 shows an example embodiment of a signal processing chain for a seismoelectric tool. The signal processing chain provides a mechanism for operating in an acoustic mode and in a seismoelectric mode. Such a seismoelectric tool may be realized by seismoelectric tool 300 of FIG. 3, seismoelectric tool 400 of FIG. 400, a combination of seismoelectric tool 300 and seismoelectric tool 400, or other seismoelectric sensor configured in accordance with the teaching herein. At 503, a focused acoustic signal is directed towards the formation. The focused acoustic signal can be generated at a predefined frequency. The focused acoustic signal can be a focused acoustic pressure pulse. The focused acoustic signal can be a focused acoustic continuous wave. The focused acoustic signal can be focused on the borehole wall, as shown in FIGS. 3 and 4, for instance, or further into the formation depending on the desired depth of investigation. Subsequently, the acoustic transducer can be switched from transmission to reception, if the option for acoustic impedance imaging and standoff measurement are desired. Optionally, two separate acoustic transducers can be used for transmission and reception. The return acoustic echo returns to the transducer after round-trip flight time for the acoustic wave. This time is dependent on the speed of sound in borehole fluid and formation and in general is a function of the density of the medium. At 510, the returning acoustic echo is acquired and filtered.

At 520, the distance to the borehole wall from the tool is determined. This determination can be based on the time of flight information with respect to the generated acoustic signal and the returning acoustic echo. Optionally, at 530, data of the acoustic impedance image and borehole geometry can be corrected for tool motion. At 540, the data for the acoustic image and borehole geometry is stored and/or transmitted to the surface. The data may be processed such that the signal transmitted to the surface can be processed directly to a display. Alternatively, the data received at the surface may be further processed to generate an image for display.

The seismoelectric signal, generated in response to the focused acoustic signal, effectively arrives at the EM sensor after ½ of the roundtrip time for the acoustic wave, since the electromagnetic field travels 5 orders of magnitude faster than the acoustic pressure wave. At 505, the returning electromagnetic signal is acquired. At 515, the received electrical response is filtered and gated. The received electromagnetic signal can be gated to select the signal generated at the apex of a generated pressure wave from the focused acoustic transducer and filtered with a narrow band matched filter to discriminate the seismoelectric signal from noise. The acquired signal can be filtered and gated for the distance from the borehole. At 525, the seismoelectric signal amplitude can be corrected for standoff variations. Standoff variations may be due to sensor placement and/or operation of the seismoelectric tool while the tool moves in the borehole. Optionally, at 535, data of the seismoelectric image can be corrected for tool motion. At 545, the data for the seismoelectric image is stored and/or transmitted to the surface. The data may be processed such that the signal transmitted to the surface can be processed directly to a display. Alternatively, the data received at the surface may be further processed to generate an image for display.

Figure 6:
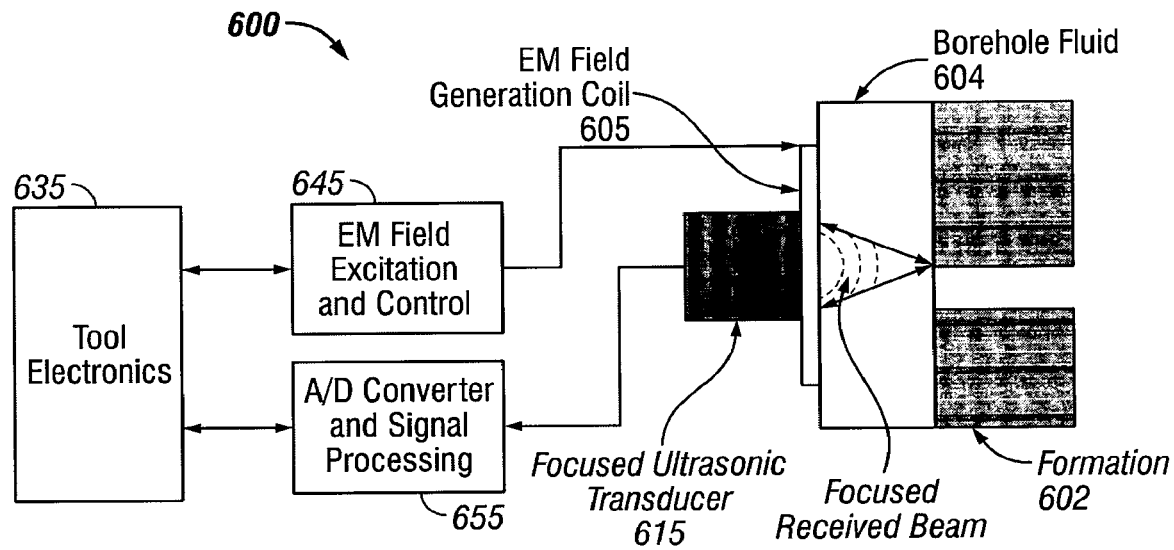
FIG. 6 shows a block diagram of an example implementation of an electroacoustic tool having a magnetic coupling to generate an electromagnetic field and a focused acoustic transducer to sense the acoustic wave generated in the formation in response to the electromagnetic signal from the source directed to the formation, according to various embodiments.

FIG. 6 shows a block diagram of an embodiment of an example implementation of an electroacoustic tool 600 having a magnetic coupling 605 to generate an electromagnetic field and a focused acoustic transducer 615 to sense the acoustic wave generated in the formation in response to the electromagnetic signal from source 605. An electromagnetic field from magnetic coupling 605 can be generated by a coil and directed through borehole fluid 604 to formation 602. Electroacoustic tool 600 may operate with one or more features discussed with respect to FIGS. 1 and 2.

Electroacoustic tool 600 includes tool electronics 635, electromagnetic field excitation and control 645, and A/D converter and signal processing 655. Tool electronics 635 can include electronics to control the tool, data storage, and surface communications. Electromagnetic field excitation and control 645 provides control signals to excite and control magnetic coupling 605. A/D converter and signal processing 655 processes the received acoustic signal from focused acoustic transducer 615 that effectively limits the region of formation 602 from which the acoustic signal is processed. The processed signal can be submitted to tool electronics 635 for data storage and/or real time surface communication. Tool electronics 635 and/or A/D converter and signal processing 655 may include an imaging unit or a portion of the imaging unit, such as imagining unit 125 of FIG. 1. Processing by A/D converter and signal processing 655 and tool electronics 635 can include processing the received signal from the electroacoustic effect to image the formation with the final processing for displaying the image conducted at the surface. Tool electronics 635, transducer excitation and control 645, and A/D converter and signal processing 655 may be integrated with various components distributed in a wireline tool or in a LWD tool.

Figure 7:
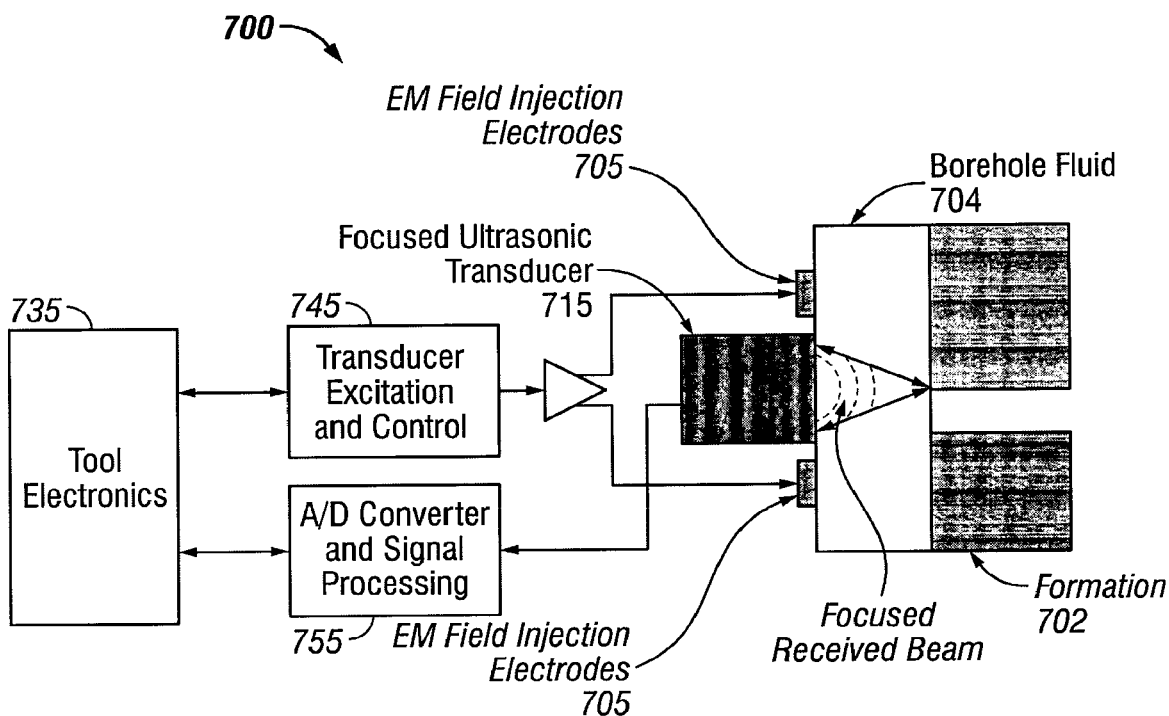
FIG. 7 shows a block diagram of an example implementation of an electroacoustic tool having electrical electrodes to generate an electromagnetic field and a focused acoustic transducer to sense the acoustic wave generated in the formation in response to the electromagnetic signal from the source directed to the formation, according to various embodiments.

FIG. 7 shows a block diagram of an embodiment of an example implementation of an electroacoustic tool 700 having electrical electrodes 705 to generate an electromagnetic field and a focused acoustic transducer 715 to sense the acoustic wave generated in the formation in response to the electromagnetic signal from source 705. The focused acoustic transducer may be a focused ultrasonic transducer. An electromagnetic field, generated electrical electrodes 705, can be directed through borehole fluid 704 to formation 702. Electroacoustic tool 700 may operate with one or more features discussed with respect to FIGS. 1 and 2.

Electroacoustic tool 700 includes tool electronics 735, electromagnetic field excitation and control 745, and A/D converter and signal processing 755. Tool electronics 735 can include electronics to control the tool, data storage, and surface communications. Electromagnetic field excitation and control 745 provides control signals to excite and control electrical electrodes 705. A/D converter and signal processing 755 processes the received acoustic signal from focused acoustic transducer 715 that effectively limits the region of formation 702 from which the acoustic signal is processed. The processed signal can be submitted to tool electronics 735 for data storage and/or real time surface communication. Tool electronics 735 and/or A/D converter and signal processing 755 may include an imaging unit or a portion of the imaging unit, such as imagining unit 125 of FIG. 1. Processing by A/D converter and signal processing 755 and tool electronics 735 can include processing the received signal from the electroacoustic effect to image the formation with the final processing for displaying the image conducted at the surface. Tool electronics 735, transducer excitation and control 745, and A/D converter and signal processing 755 may be integrated with various components distributed in a wireline tool or in a LWD tool.

In an electroacoustic tool, an electromagnetic field pulse can be generated either by magnetic coupling (coils) or electrical electrodes coupling to the formation through conductive fluid (as shown in FIGS. 6 and 7) producing a pressure wave in the formation through electroacoustic conversion. After a single time of flight, the acoustic pressure wave generated in formation arrives from the focal point of the acoustic transducer (615 of FIG. 6 and 715 of FIG. 7). By shaping the face of the acoustic transducer or by proper phasing of an acoustic array forming the acoustic transducer, the acoustic transducer can be arranged to be most sensitive to the pressure wave arriving from its focal point, while discriminating against pressure waves arriving from other points in the formation. As a result, a high resolution image of the electroacoustic properties of the formation can be obtained.

In an electroacoustic tool, such as shown in FIGS. 6 and 7, in order to compensate for standoff effects, the acoustic transducer (615 of FIG. 6 and 715 of FIG. 7) can be periodically used in a caliper mode. In a caliper mode, the acoustic sensor generates an acoustic pulse and receives the echo from the acoustic pulse such that the time of arrival of the echo can be measured. Operating the acoustic sensor in a full acoustic mode for the caliper mode may occur in periods in which the acoustic sensor is not operating in electroacoustic mode with the electromagnetic source (605 of FIG. 6 and 705 of FIG. 7).

Figure 8:
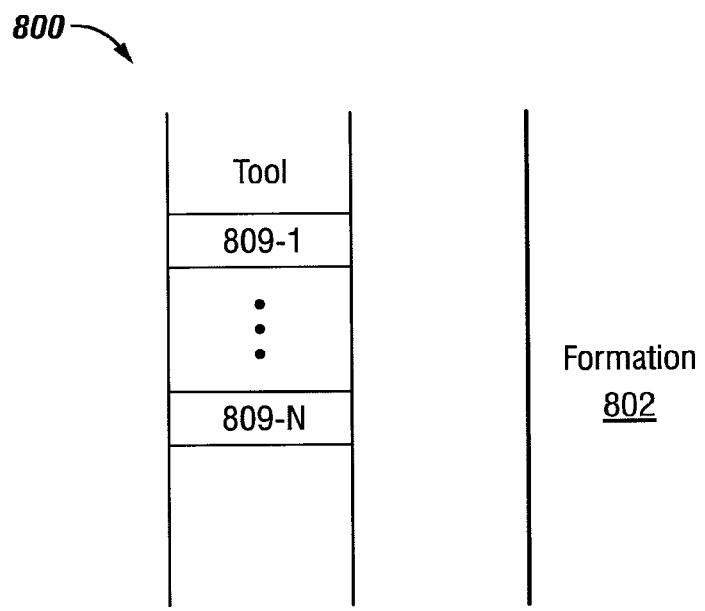
FIG. 8 shows a block diagram of an example tool having permanent magnets disposed on the body of the tool to provide a static magnetic field to polarize a formation, according to various embodiments.

Both seismoelectric and electroacoustic effects can be enhanced by addition of a static magnetic field polarizing the formation 802. This can be accomplished by disposing permanent magnets 809-1 . . . 809-N on the body of a tool 800 as shown in FIG. 8. Alternatively, one or more of magnets 809-1 . . . 809-N can be realized as electromagnets such that applying a DC current to the electromagnet can enhance both seismoelectric and electroacoustic effects. The orientation of the magnetic field can be selected such that the desired seismoelectric or electroacoustic signal is maximized.

In addition, both seismoelectric and electroacoustic effects can be enhanced by doping the fluid filling the pores of the formation with magnetic particles. The magnetic particles can include, but are not limited to, iron or vanadium compounds. The magnetic particles may be realized as nanoparticles. When excited by an electromagnetic field, the nanoparticles suspended in the fluid produce acoustic echo at double the excitation frequency due to domain rotation. This excitation can serve as a mechanism to discriminate the signal from injected nanoparticles from that induced by the formation fluids. The use of injected nanoparticles can be used to study invasion profiles and invasion progression in LWD applications where the drilling mud is doped with magnetic nanoparticles.

Figure 9:
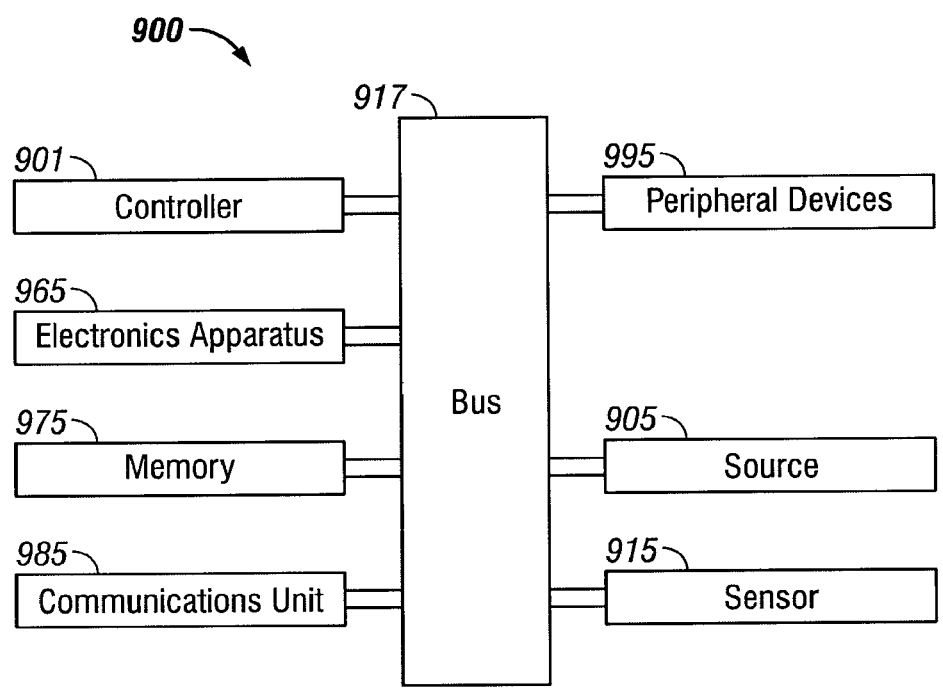
FIG. 9 depicts a block diagram of features of an example system having a source to expose a formation to a probe signal to image the formation based on signals received in a sensor from the formation in response to the probe signal, according to various embodiments.

FIG. 9 depicts a block diagram of features of an embodiment of a system 900 having a source 905 to expose a formation to a probe signal to image the formation. System 900 includes a sensor 915 to sense a converted signal, where the converted signal is based on conversion of the probe signal between acoustic energy and electromagnetic energy. Source 905 or sensor 915 can include a focused transducer. The focused transducer can be realized as a focused acoustic transducer. The converted signal received by system 900 can be used to image the formation using the converted signal. Source 905 or sensor 915 can be structured and fabricated as a seismoelectric tool or an electroacoustic tool associated with FIGS. 1-8, in accordance with various embodiments as taught herein.

System 900 can also include a controller 901, a memory 975, an electronic apparatus 965, and a communications unit 985. Various combinations of controller 901, memory 975, and communications unit 985 can be arranged to operate as a processing unit for source 905 and sensor 915. Such a processing unit can process received signals from a seismoelectric effect or from electroacoustic effect to image a formation. The imaging of the formation can be conducted with high resolution and sufficient contrast to detect thin formation laminations with resolution of 0.25 inches or finer. System 900 can be implemented in both wireline and LWD mode.

Memory 975 and/or one or more components of system 900 can include instructions to operate a tool, including source 905 or sensor 915, downhole in a well to image a formation. Other machine-readable storage media can be used, where the machine-readable storage media store instructions, which, when performed by a machine, cause the machine to perform operations to image formations based on the seismoelectric effect or the electroacoustic effect. Such operations can include, but are not limited to, exposing a formation to a probe signal; controlling sensing of a converted signal, where the converted signal is based on conversion of the probe signal between acoustic energy and electromagnetic energy in the formation, wherein a focused transducer is used in exposing the formation to the probe signal or in sensing the converted signal; and imaging the formation using the converted signal. The instructions can include instructions to apply a static magnetic field to polarize the formation. The instructions can include instructions to transmit information to earth surface from downhole in a well, where the information corresponds to the converted signal. The machine-readable storage medium can include storage medium distributed among components at a well drilling site. The machine readable storage media may include other instructions to operate a tool including a source and sensor operating based on the seismoelectric effect and/or the electroacoustic effect to provide high resolution downhole imaging, in accordance with embodiments similar to or identical to embodiments discussed herein.

Portions or all of controller 901, memory 975, and communications unit 985 can be structured to operate when located downhole. Communications unit 985 can include apparatus operable to provide downhole communications in a drilling operation. Such downhole communications can be provided by a telemetry system, for example. Communications unit 985 may be coupled to a communication line to provide measurement results to the surface of a well.

System 900 can also include a bus 917, where bus 917 provides electrical conductivity among the components of system 900. Bus 917 can include an address bus, a data bus, and a control bus, each independently configured. Bus 917 can also use common conductive lines for providing one or more of address, data, or control, the use of which is regulated by controller 901. Bus 917 can be configured such that the components of system 900 are distributed. Such distribution can be arranged between downhole components and surface components such as a processing unit arranged as one or more components of controller 901, a memory 975, an electronic apparatus 965, and peripheral devices 995 of system 900. Alternatively, the components controller 901, a memory 975, an electronic apparatus 965, and portions of peripheral devices 995 can be co-located such as on one or more collars of a drill string structure.

In various embodiments, peripheral devices 995 include displays, additional storage memory, and/or other control devices that may operate in conjunction with controller 901 and/or memory 975. In an embodiment, controller 901 is a processor. A peripheral device arranged as a display can be used with instructions stored in memory 975 to implement a user interface to manage the operation of source 905 and sensor 915 in system 900 and/or components distributed within system 900. In addition, the display may provide an instrument to display an image of the measured formation in real time to aid in management and control of a drilling operation.

Figure 10:
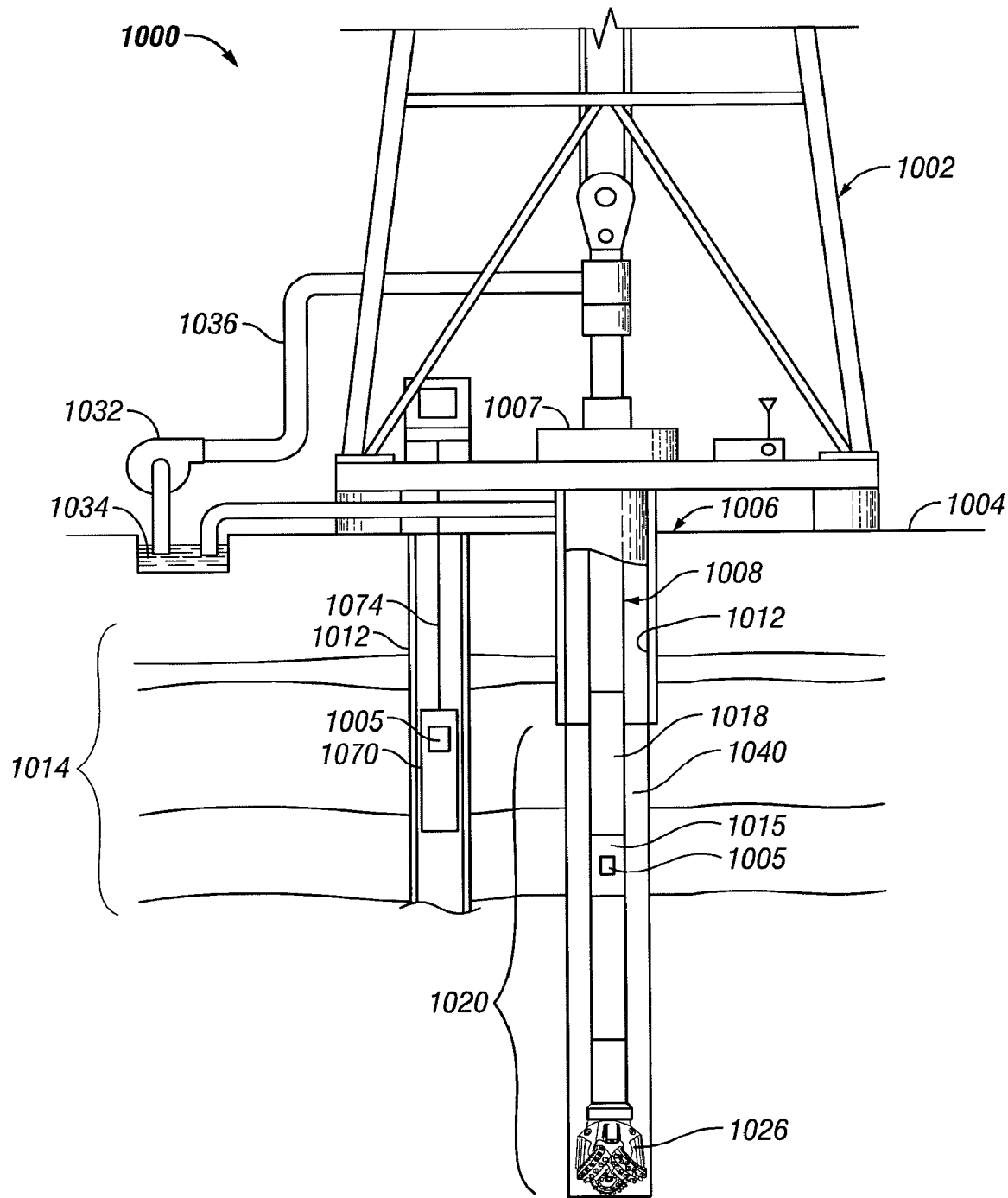
FIG. 10 depicts an embodiment of a system at a drilling site, according to various embodiments.

FIG. 10 depicts an embodiment of a system 1000 at a drilling site, where system 1000 includes a tool 1005 having a source and a sensor operating based on the seismoelectric effect or the electroacoustic effect to provide high resolution downhole imaging in a well. Tool 1005 can be structured and fabricated in accordance with various embodiments as taught herein.

System 1000 can include a drilling rig 1002 located at a surface 1004 of a well 1006 and a string of drill pipes, that is, drill string 1008, connected together so as to form a drilling string that is lowered through a rotary table 1007 into a wellbore or borehole 1012. The drilling rig 1002 can provide support for drill string 1008. The drill string 1008 can operate to penetrate rotary table 1007 for drilling a borehole 1012 through subsurface formations 1014. The drill string 1008 can include drill pipe 1018 and a bottom hole assembly 1020 located at the lower portion of the drill pipe 1018.

The bottom hole assembly 1020 can include drill collar 1015, tool 1005 attached to drill collar 1015, and a drill bit 1026. The drill bit 1026 can operate to create a borehole 1012 by penetrating the surface 1004 and subsurface formations 1014. Tool 1005 can be structured for an implementation in the borehole of a well as a measurements-while-drilling (MWD) system such as a logging-while-drilling (LWD) system. The housing containing tool 1005 can include flow control components, such as a pump, to inject magnetic particles into the fluid in pores in a formation to enhance imaging of the formation. The housing containing tool 1005 can include electronics to activate a source of tool 1005 and collect responses from a sensor of tool 1005. Such electronics can include a processing unit to analyze signals sensed by tool 1005 and provide measurement results to the surface over a standard communication mechanism for operating a well. Alternatively, electronics can include a communications interface to provide signals sensed by tool 1005 to the surface over a standard communication mechanism for operating a well, where these sensed signals can be analyzed at a processing unit at the surface.

In various embodiments, tool 1005 may be included in a tool body 1070 coupled to a logging cable 1074 such as, for example, for wireline applications. Tool body 1070 housing tool 1005 can include flow control components, such as a pump, to inject magnetic particles into the fluid in pores in a formation to enhance imaging of the formation. Tool body 1070 containing tool 1005 can include electronics to activate sensor of tool 1005 and collect responses from a sensor of tool 1005. Such electronics can include a processing unit to analyze signals sensed by tool 1005 and provide measurement results, such as formation imaging, to the surface over a standard communication mechanism for operating a well. Alternatively, electronics can include a communications interface to provide signals sensed by tool 1005 to the surface over a standard communication mechanism for operating a well, where these collected sensed signals are analyzed at a processing unit at the surface. Logging cable 1074 may be realized as a wireline (multiple power and communication lines), a mono-cable (a single conductor), and/or a slick-line (no conductors for power or communications), or other appropriate structure for use in bore hole 1012.

During drilling operations, the drill string 1008 can be rotated by the rotary table 1007. In addition to, or alternatively, the bottom hole assembly 1020 can also be rotated by a motor (e.g., a mud motor) that is located downhole. The drill collars 1015 can be used to add weight to the drill bit 1026. The drill collars 1015 also can stiffen the bottom hole assembly 1020 to allow the bottom hole assembly 1020 to transfer the added weight to the drill bit 1026, and in turn, assist the drill bit 1026 in penetrating the surface 1004 and subsurface formations 1014.

During drilling operations, a mud pump 1032 can pump drilling fluid (sometimes known by those of skill in the art as "drilling mud") from a mud pit 1034 through a hose 1036 into the drill pipe 1018 and down to the drill bit 1026. The drilling fluid can flow out from the drill bit 1026 and be returned to the surface 1004 through an annular area 1040 between the drill pipe 1018 and the sides of the borehole 1012. The drilling fluid may then be returned to the mud pit 1034, where such fluid is filtered. In some embodiments, the drilling fluid can be used to cool the drill bit 1026, as well as to provide lubrication for the drill bit 1026 during drilling operations. Additionally, the drilling fluid may be used to remove subsurface formation 1014 cuttings created by operating the drill bit 1026.

Although the system 1000 has been shown as applied to a land-based drilling rig, this system, and indeed all of the presently disclosed embodiments, may be used in conjunction with offshore drilling rigs as well as land-based drilling rigs.

In various embodiments, a focused transducer implemented in a tool in conjunction with an application using a seismoelectric effect and/or an electroacoustic effect can provide an ability to detect thin formation laminations with resolution of 0.25 inches or finer. Such a tool can be implemented in both wireline and LWD mode. Contrasts can be detected, using the tool, that include porosity, permeability, and mineralogy. The technology for the tool can be applied to all types of mud. The choice of the sensing method can be influenced by the conductivity of the borehole fluid.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

For example, the system of FIG. 10 may realize the systems of any, a combination or all of the systems of FIGS. 1, 2, 8 and 9, and may incorporate the tools of one or more of FIGS. 3, 4, 6 and 7, in particular in the bottom hole assembly 1020, in the tool body 1070, or elsewhere.

What is claimed is:

1. A downhole tool for generating high-resolution borehole images, the tool comprising:
   a housing;
   a pump carried by the housing to inject magnetic particles into pores of a formation;
   a source carried by the housing, the source operable to propagate a probe signal towards the formation to excite the injected magnetic particles with an electromagnetic field;
   a sensor carried by the housing, the sensor operable to receive a formation signal resulting from the probe signal propagated by the source; and
   an imaging unit coupled to the sensor; the imaging unit operable to generate a high resolution image using the formation signal received by the sensor,
   wherein at least one of the source or the sensor comprises a dynamically focused acoustic transducer, and
   wherein at least one of the probe signal or the formation signal is an acoustic signal.

2. The tool of claim 1, wherein the acoustic signal is a focused acoustic signal.

3. The tool of claim 1, wherein the pump carried by the housing is operable to inject the magnetic particles into fluid within the pores of the formation.

4. The tool of claim 1, further comprising electronics carried by the housing and electrically coupled to the source and the sensor to control operation of the source and sensor.

5. The tool of claim 1, Therein the dynamically focused acoustic transducer is an array of dynamically focused acoustic transducers.

6. The tool of claim 5, wherein each dynamically focused transducer in the array comprises an array of elemental transducers.

7. The tool of claim 6, wherein the tool further comprises a preamplifier in electrical communication with the elemental transducers and a multi-tap delay line in electrical communication with the preamplifier.

8. The tool of claim 6, wherein the tool further comprises a multi-tap delay line in electrical communication with the elemental transducers and a summing amplifier in electrical communication with the multi-tap delay line.

9. The tool of claim 1, wherein the dynamically focused acoustic transducer creates a focused illumination to enable higher resolution.

10. A method for generating high-resolution borehole images, the method comprising:
    positioning a downhole tool including a source and a sensor within a borehole extending into a formation, the source including an array of dynamically focused acoustic transducers;
    injecting magnetic particles into pores of the formation via a housing of the downhole tool positioned within the borehole;
    propagating an acoustic probe signal from the source through the pores of the formation in order to generate an electromagnetic field that excites the injected magnetic particles;
    utilizing the sensor to sense a formation signal resulting from the excitation of the injected magnetic particles by the electromagnetic field generated from the propagation of the acoustic probe signal; and
    generating a high resolution image using the formation signal.

11. The method of claim 10, further comprising focusing a focused acoustic signal on a borehole wall.

12. The method of claim 10, further comprising focusing a focused acoustic signal at a desired depth of investigation in the formation.

13. The method of claim 12, wherein the focused acoustic signal is generated at a predefined frequency.

14. The method of claim 12, wherein the focused acoustic signal is a pressure pulse.

15. The method of claim 12, wherein the focused acoustic signal is a continuous wave.

16. The method of claim 10, further comprising utilizing the array of dynamically focused acoustic transducers to create a focused illumination to enable higher resolution.

17. A method for generating high-resolution borehole images, the method comprising:
    positioning a downhole tool including a source and a sensor within a borehole extending into a formation;
    injecting magnetic particles into pores of the formation via a housing of the downhole tool positioned within the borehole;
    utilizing the source to propagate a probe signal from the source towards the formation in order to excite the injected magnetic particles with an electromagnetic field;
    utilizing an array of dynamically focused acoustic transducers to sense a formation signal at the sensor, the formation signal resulting from the probe signal; and
    generating a high resolution image using the formation signal.

18. The method of claim 17, her comprising focusing a focused acoustic signal on a borehole wall.

19. The method of claim 17, further comprising focusing a focused acoustic signal at a desired depth of investigation in the formation.

20. The method of claim 17, further comprising utilizing the array of dynamically focused acoustic transducers to create a focused illumination to enable higher resolution.

* * * * *

UNITED STATES PATENT AND TRADEMARK OFFICE
CERTIFICATE OF CORRECTION

| | | |
|---|---|---|
| PATENT NO. | : 10,914,856 B2 | Page 1 of 1 |
| APPLICATION NO. | : 15/692478 | |
| DATED | : February 9, 2021 | |
| INVENTOR(S) | : Marian Morys | |

It is certified that error appears in the above-identified patent and that said Letters Patent is hereby corrected as shown below:

In the Claims

Column 13, Line 60, in Claim 5, change "Therein" to -- wherein --

Column 14, Line 59, in Claim 18, change "her" to -- further --

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*